United States Patent
Rost et al.

(10) Patent No.: US 12,495,326 B2
(45) Date of Patent: Dec. 9, 2025

(54) EXPOSURE OF COMMUNICATIONS SYSTEM CONNECTIVITY AND DATA NETWORK CONNECTIVITY TOPOLOGY

(71) Applicant: Nokia Technologies Oy, Espoo (FI)

(72) Inventors: Peter Rost, Heidelberg (DE); Colin Kahn, Morris Plains, NJ (US)

(73) Assignee: Nokia Technologies Oy, Espoo (FI)

( * ) Notice: Subject to any disclaimer, the term of this patent is extended or adjusted under 35 U.S.C. 154(b) by 419 days.

(21) Appl. No.: 18/006,562

(22) PCT Filed: Jul. 9, 2021

(86) PCT No.: PCT/IB2021/056204
§ 371 (c)(1),
(2) Date: Jan. 23, 2023

(87) PCT Pub. No.: WO2022/018559
PCT Pub. Date: Jan. 27, 2022

(65) Prior Publication Data
US 2023/0300666 A1   Sep. 21, 2023

Related U.S. Application Data

(60) Provisional application No. 63/056,162, filed on Jul. 24, 2020.

(51) Int. Cl.
*H04W 28/02* (2009.01)
*H04W 40/24* (2009.01)

(52) U.S. Cl.
CPC ..... *H04W 28/0268* (2013.01); *H04W 40/248* (2013.01)

(58) Field of Classification Search
CPC ............... H04W 56/005; H04W 56/00; H04W 72/1268; H04W 74/0833; H04W 74/0841; H04W 74/0866; H04W 74/08; H04W 72/12; H04W 60/00; H04W 76/18; H04W 68/005; H04W 8/24; H04W 84/042; H04W 92/24; H04W 68/00; H04W 28/0268; H04W 40/24; H04W 40/248; H04W 28/02; G01S 13/003; G01S 13/765;
(Continued)

(56) References Cited

U.S. PATENT DOCUMENTS

2016/0080968 A1* 3/2016 Jeong ................ H04W 28/0236
370/230
2016/0277272 A1* 9/2016 Peach ................. H04L 43/0858
(Continued)

FOREIGN PATENT DOCUMENTS

CA          3117732 A1    5/2020
WO   2019/214810 A1   11/2019
(Continued)

OTHER PUBLICATIONS

"IEEE 802.1", Wikipedia, Retrieved on Feb. 1, 2023, Webpage available at : https://en.wikipedia.org/wiki/IEEE_802.1.
(Continued)

*Primary Examiner* — Nathan S Taylor
(74) *Attorney, Agent, or Firm* — Barta Jones, PLLC

(57) ABSTRACT

Systems, methods, apparatuses, and computer program products for exposure of 3GPP communications network connectivity and data network connectivity topology are provided.

9 Claims, 6 Drawing Sheets

(58) Field of Classification Search
CPC ........ G01S 13/767; G01S 13/87; G01S 13/00; G01S 13/76; G01S 5/02; H04L 43/0864; H04L 45/66
USPC ......................................................... 370/329
See application file for complete search history.

(56) References Cited

U.S. PATENT DOCUMENTS

| | | | |
|---|---|---|---|
| 2017/0026225 A1* | 1/2017 | Smith | H04L 49/557 |
| 2018/0054755 A1* | 2/2018 | Lee | H04W 72/21 |
| 2018/0062930 A1* | 3/2018 | Dhesikan | H04L 45/125 |
| 2018/0069618 A1* | 3/2018 | Loehr | H04W 72/1263 |
| 2018/0167307 A1* | 6/2018 | Barry | H04L 45/02 |
| 2019/0199613 A1* | 6/2019 | Jambur Sathyanarayana | H04L 43/20 |
| 2019/0274065 A1* | 9/2019 | Zhao | H04W 24/10 |
| 2020/0259896 A1* | 8/2020 | Sachs | H04L 67/12 |
| 2020/0267785 A1* | 8/2020 | Talebi Fard | H04L 45/04 |
| 2020/0351973 A1* | 11/2020 | Mannweiler | H04W 88/18 |
| 2021/0092616 A1* | 3/2021 | Desai | H04B 17/364 |
| 2021/0176734 A1* | 6/2021 | You | H04W 40/22 |
| 2021/0219357 A1* | 7/2021 | Talebi Fard | H04L 67/14 |
| 2021/0243771 A1* | 8/2021 | Mannweiler | H04W 24/02 |
| 2021/0274585 A1* | 9/2021 | Yu | H04W 28/0236 |
| 2022/0182896 A1* | 6/2022 | Talebi Fard | H04W 36/0085 |
| 2022/0224651 A1* | 7/2022 | Rost | H04L 47/28 |
| 2022/0322254 A1* | 10/2022 | Zhang | H04L 67/141 |
| 2023/0019215 A1* | 1/2023 | Wang | H04L 47/24 |
| 2023/0109817 A1* | 4/2023 | Wang | H04W 40/22 |
| 2023/0188381 A1* | 6/2023 | Luetzenkirchen | H04W 76/11 370/328 |
| 2023/0276294 A1* | 8/2023 | Kahn | H04W 28/0236 370/230 |

FOREIGN PATENT DOCUMENTS

| | | | | |
|---|---|---|---|---|
| WO | WO-2021219227 A1 * | 11/2021 | | H04L 47/28 |
| WO | 2022/018598 A1 | 1/2022 | | |

OTHER PUBLICATIONS

"3rd Generation Partnership Project; Technical Specification Group Services and System Aspects; Study on enhancement of 5G System (5GS) for vertical and Local Area Network (LAN) services (Release 16)", 3GPP TR 23.734, V16.2.0, Jun. 2019, pp. 1-117.

"3rd Generation Partnership Project; Technical Specification Group Services and System Aspects; Study on enhanced support of Industrial Internet of Things (IIoT) in the 5G System (5GS) (Release 17)", 3GPP TR 23.700-20, V0.3.0, Jan. 2020, pp. 1-33.

"3rd Generation Partnership Project; Technical Specification Group Services and System Aspects; System architecture for the 5G System (5GS); Stage 2 (Release 16)", 3GPP TS 23.501, V16.4.0, Mar. 2020, pp. 1-430.

"IEEE Standard for Local and Metropolitan Area Networks—Bridges and Bridged Networks Amendment 31: Stream Reservation Protocol (SRP) Enhancements and Performance Improvements", IEEE Computer Society, IEEE Std 802.1Qcc™-2018, Jun. 14, 2018, pp. 1-206.

"IEEE Standard for Local and metropolitan area networks—Station and Media Access Control Connectivity Discovery", IEEE Computer Society, IEEE Std 802.1AB™-2016, Jan. 29, 2016, 145 pages.

"3rd Generation Partnership Project; Technical Specification Group Services and System Aspects; Service requirements for cyber-physical control applications in vertical domains; Stage 1 (Release 17)", 3GPP TS 22.104, V17.3.0, Jul. 2020, pp. 1-76.

"3rd Generation Partnership Project; Technical Specification Group Technical Specification Group Services and System Aspects; Service requirements for video, imaging and audio for professional applications (VIAPA); Stage 1 (Release 17)", 3GPP TS 22.263, V17.1.0, Jul. 2020, pp. 1-18.

International Search Report and Written Opinion received for corresponding Patent Cooperation Treaty Application No. PCT/IB2021/056204, dated Oct. 27, 2021, 13 pages.

* cited by examiner

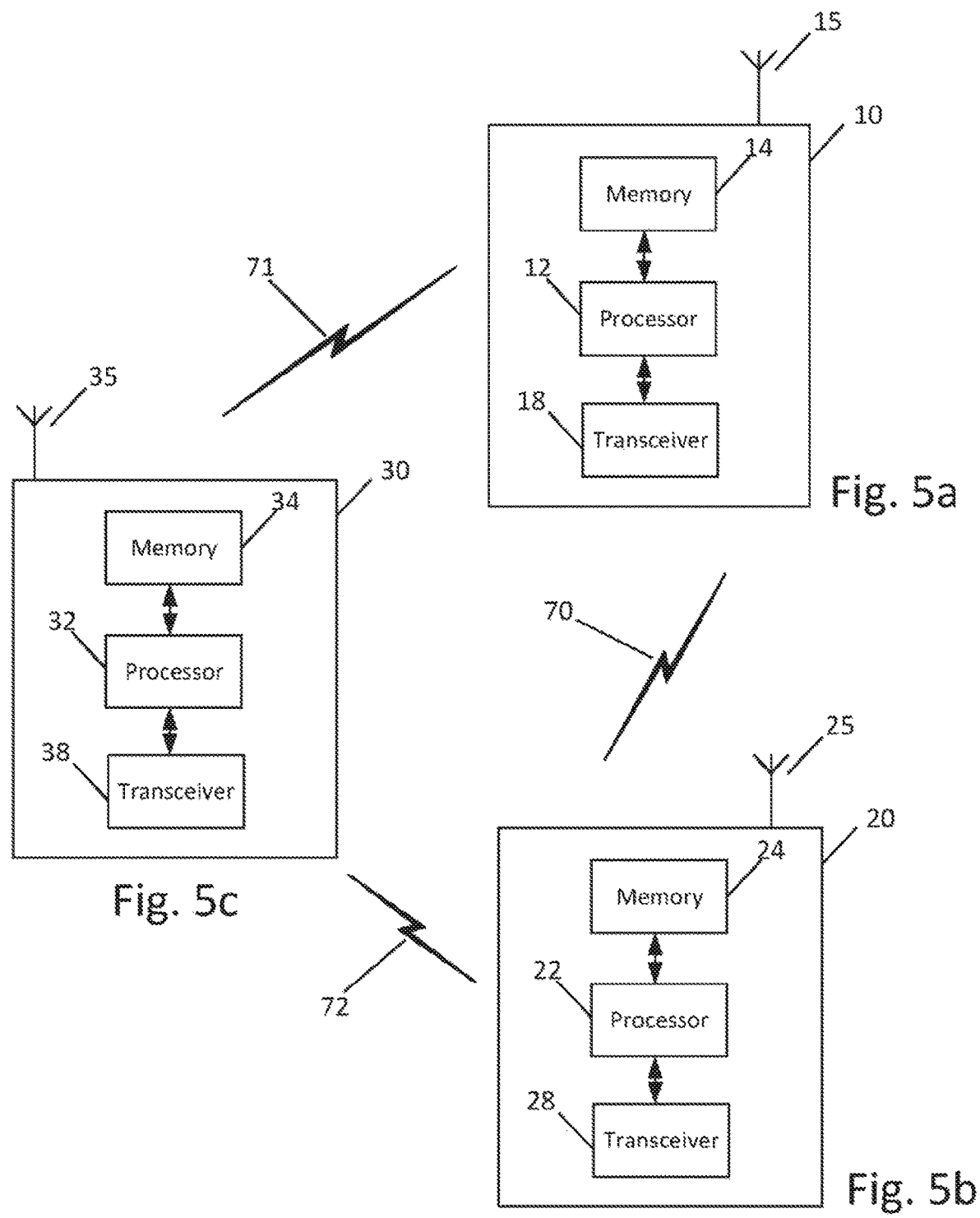

EXPOSURE OF COMMUNICATIONS SYSTEM CONNECTIVITY AND DATA NETWORK CONNECTIVITY TOPOLOGY

RELATED APPLICATION

This application was originally filed as PCT Application No. PCT/IB2021/056204, filed on Jul. 9, 2021, which claims the benefit of priority of U.S. Patent Application No. 63/056,162, filed on Jul. 24, 2020, both of which are incorporated herein by reference in their entirety.

FIELD

Some example embodiments may generally relate to mobile or wireless telecommunication systems, such as Long Term Evolution (LTE) or fifth generation (5G) radio access technology or new radio (NR) access technology, or other communications systems. For example, certain embodiments may relate to systems and/or methods for exposure of communications network connectivity and data network connectivity topology.

BACKGROUND

Examples of mobile or wireless telecommunication systems may include the Universal Mobile Telecommunications System (UMTS) Terrestrial Radio Access Network (UTRAN), Long Term Evolution (LTE) Evolved UTRAN (E-UTRAN), LTE-Advanced (LTE-A), MulteFire, LTE-A Pro, and/or fifth generation (5G) radio access technology or new radio (NR) access technology. 5G wireless systems refer to the next generation (NG) of radio systems and network architecture. A 5G system is mostly built on a 5G new radio (NR), but a 5G (or NG) network can also build on the E-UTRA radio. It is estimated that NR provides bitrates on the order of 10-20 Gbit/s or higher, and can support at least service categories such as enhanced mobile broadband (eMBB) and ultra-reliable low-latency-communication (URLLC) as well as massive machine type communication (mMTC). NR is expected to deliver extreme broadband and ultra-robust, low latency connectivity and massive networking to support the Internet of Things (IoT). With IoT and machine-to-machine (M2M) communication becoming more widespread, there will be a growing need for networks that meet the needs of lower power, low data rate, and long battery life. The next generation radio access network (NG-RAN) represents the RAN for 5G, which can provide both NR and LTE (and LTE-Advanced) radio accesses. It is noted that, in 5G, the nodes that can provide radio access functionality to a user equipment (i.e., similar to the Node B, NB, in UTRAN or the evolved NB, eNB, in LTE) may be named next-generation NB (gNB) when built on NR radio and may be named next-generation eNB (NG-eNB) when built on E-UTRA radio.

BRIEF DESCRIPTION OF THE DRAWINGS

For proper understanding of example embodiments, reference should be made to the accompanying drawings, wherein:

FIG. 5a illustrates an example block diagram of an apparatus, according to an embodiment;

FIG. 5b illustrates an example block diagram of an apparatus, according to an embodiment; and FIG. 5c illustrates an example block diagram of an apparatus, according to an embodiment.

DETAILED DESCRIPTION

Figure 1:
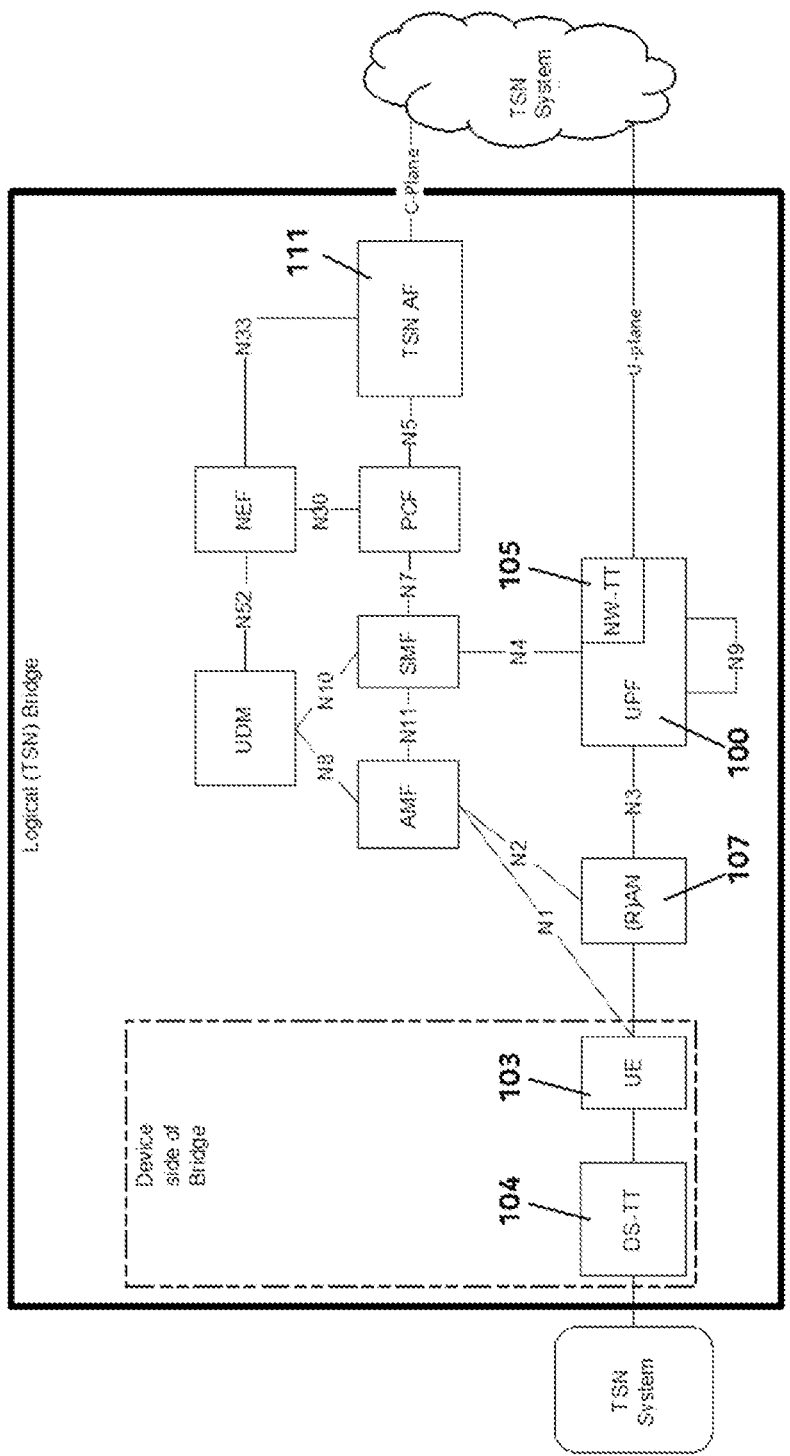
FIG. 1 illustrates an example system architecture in which a $5^{th}$ generation system (5GS) appears as a time sensitive network (TSN) bridge, according to one example.

It will be readily understood that the components of certain example embodiments, as generally described and illustrated in the figures herein, may be arranged and designed in a wide variety of different configurations. Thus, the following detailed description of some example embodiments of systems, methods, apparatuses, and computer program products for exposure of communications network connectivity and data network connectivity topology, is not intended to limit the scope of certain embodiments but is representative of selected example embodiments.

The features, structures, or characteristics of example embodiments described throughout this specification may be combined in any suitable manner in one or more example embodiments. For example, the usage of the phrases "certain embodiments," "some embodiments," or other similar language, throughout this specification refers to the fact that a particular feature, structure, or characteristic described in connection with an embodiment may be included in at least one embodiment. Thus, appearances of the phrases "in certain embodiments," "in some embodiments," "in other embodiments," or other similar language, throughout this specification do not necessarily all refer to the same group of embodiments, and the described features, structures, or characteristics may be combined in any suitable manner in one or more example embodiments.

Additionally, if desired, the different functions or procedures discussed below may be performed in a different order and/or concurrently with each other. Furthermore, if desired, one or more of the described functions or procedures may be optional or may be combined. As such, the following description should be considered as illustrative of the principles and teachings of certain example embodiments, and not in limitation thereof.

Some example embodiments may generally relate to industrial networks, also known as Industrial Internet of Things (IIoT) or Industry 4.0 networks. However, example embodiments may also relate to other types of networks or applications. In industrial networks, 3GPP technologies may be applied in addition to fixed-line IEEE Ethernet based networks in industrial environments to provide flexibility (e.g., in terms of mobility) and scalability (e.g., in terms of number of sensors or actuators). Consideration is being made for $5^{th}$ generation system (5GS) enhanced support of vertical and local area network (LAN) services and the option to transparently integrate the 5GS as a time sensitive network (TSN) bridge. This integration includes the 5GS exposing itself as TSN bridge with full protocol compatibility between the 5GS and IEEE TSN bridged Ethernet networks. This imposes significant constraints on the 5GS and the data network to which it connects and may imply sub-optimal operation of the 5GS.

It is currently being studied how the 5GS may expose the important parameters and services related to time sensitive communication (TSC) to more flexibly support various networking scenarios, such as those where deterministic, periodic traffic must be transported with low latency. Based on the proposed exposure framework, an external controller may modify the operation of the 5GS.

In addition to the already standardized support for IEEE 802.1Qcc fully centralized TSN configuration model, it is expected that there will be standardization for an exposure interface of 5GS towards network management or control running in an industrial or vertical domain, e.g., an industrial automation control may utilize the exposure interface to optimize the operation of the 5GS. One problem in this area is the user plane interface between the 5GS (UE and UPF) and the industrial fixed-line network, which may utilize IEEE bridged Ethernet as well as higher-layer protocols such as internet protocol (IP).

As will be discussed in more detail in the following, certain example embodiments may address at least the problem of associating UEs and protocol data unit (PDU) sessions with end-to-end network topology in the Data Network (DN), i.e., including devices and networks connected to UEs as well as to user plane functions (UPFs). This association can ensure that entities using the 5GS network exposure are able to address the correct UE and PDU session within the 5GS in order to fulfill an end-to-end quality of service (QoS) requirement. In addition, for periodic deterministic communication, knowing the DN topology with respect to the 5GS allows for more accurate determination of burst arrival times used to optimize scheduling in the 5GS radio access network (RAN). To enable this association, the 5GS may have to also expose connectivity information, which allows an external function to correlate this connectivity information with its own network topology or connectivity information.

TSN is currently standardized as the mechanism for communication within industrial networks. In TSN, a set of IEEE 802.1 protocols (e.g., IEEE 802.1AS-Rev, 802.1CB, 802.1Qcc, 802.1Qch, 802.1Qci, 802.1Qcj, 802.1CM, 802.1Qcp, 802.1Qcr, 802.1AB) may be applied to achieve deterministic data transmission with guaranteed low latency with time-aware devices (which need to be configured properly). In parallel to TSN standardization, the 5GS support of TSN has been defined considering the fully centralized TSN configuration model, as illustrated in the example of FIG. 1.

More specifically, FIG. 1 illustrates an example system architecture in which a 5GS appears as a TSN bridge 101. As illustrated in the example of FIG. 1, the 5GS can be integrated transparently as a bridge into the TSN network, with a TSN Translator (TT) in the UE (DS-TT) 104 and a TSN Translator (NW-TT) 105 in user plane function (UPF) 100. The device-side translator (DS-TT) and network-side translator (NW-TT) can perform protocol translation and adaptation. As such, the translators and the TSN-application function (AF) 111 provide interoperability between IEEE TSN network bridges (where the IEEE protocols mentioned above prevail) and the 5G core network (5GC), RAN and UE (where 3GPP protocols are applicable). In this manner, 3GPP procedures can be hidden from connected TSN networks. The TTs 104, 105 allow the 5GS bridge 101 to appear transparently as ports in the user plane, and the TSN AF 111 allows the 5GS bridge 101 to be configured as a bridge by the management plane and/or control plane, just like other TSN bridges.

Furthermore, certain 3GPP releases already support Ethernet PDU sessions. In this case, a PDU session transports Layer 2 Ethernet frames instead of Layer 3 IP packets. In the case of an Ethernet PDU session, the UPF is able to "learn MAC addresses," i.e., when the UPF receives on a PDU session an Ethernet frame with an unknown source-address, the UPF remembers the association of PDU session and source MAC (similar on N6 Interface). Using this "MAC Learning," the UPF is able to build a table in which each known MAC address is associated to a PDU Session or N6 Interface. This may be used to make sure that Ethernet frames are correctly forwarded.

In the following, some example embodiments include a method based on IEEE 802.1AB (link layer discovery protocol), which has an advantage of being a well-established protocol in the IT domain for collecting network topology information. It further allows for exchanging additional device information between devices and connected bridges. However, it should be noted that example embodiments are not limited this protocol, as further example embodiments may be based on other protocols.

Therefore, certain example embodiments may address the issue where an application function (AF) that has knowledge of deterministic application requirements should be able to request TSC services from the 5GS and as authorized, be notified of pertinent network events. For example, this may include the ability for an AF to request absolute delay and jitter requirements, and mechanisms to enable the policy control function (PCF) to determine the 5GS QoS parameters based on the requirements received from the AF. This may also include the ability for an AF to indicate periodicity, burst size and burst arrival time (e.g., as defined in 3GPP Release-16 for TSC Assistance information), optionally burst spread and timing domain associated with these parameters to the network exposure function (NEF). Additionally, this may include an approach for enabling an application and 5GS to agree on a TSC configuration that addresses the application's needs and can be supported by 5GS.

Certain example embodiments are directed to a method to enable setup of 5GS QoS for end stations that provide requirements to an AF capable of requesting TSC services from a 5GS. In some embodiments, the method may provide at least two sets of information that may be needed by or useful to the AF.

The first set of information may include the network topology between the two end stations that wish to communicate time-sensitive flows, e.g., periodic deterministic flows. Knowledge of the topology may be used by the AF to determine 5GS arrival times for periodic bursts sent by an end-station. These times may be needed to determine TSC assistance information (TSCAI) used in the RAN for scheduling and/or for setting hold-and-forward buffers in the UE or UPF.

The second set of information may include the association between end stations that have requirements for deterministic flows, where the requirements are provided to the AF and UEs/PDU sessions in the 5GS that transport those flows. This association may be needed so the AF can determine that end-station connectivity is via the 5GS, and/or so the AF can indicate, in its request to the 5GS for QoS/TSC service, the UE/PDU session that is providing connectivity for the device.

Figure 2:
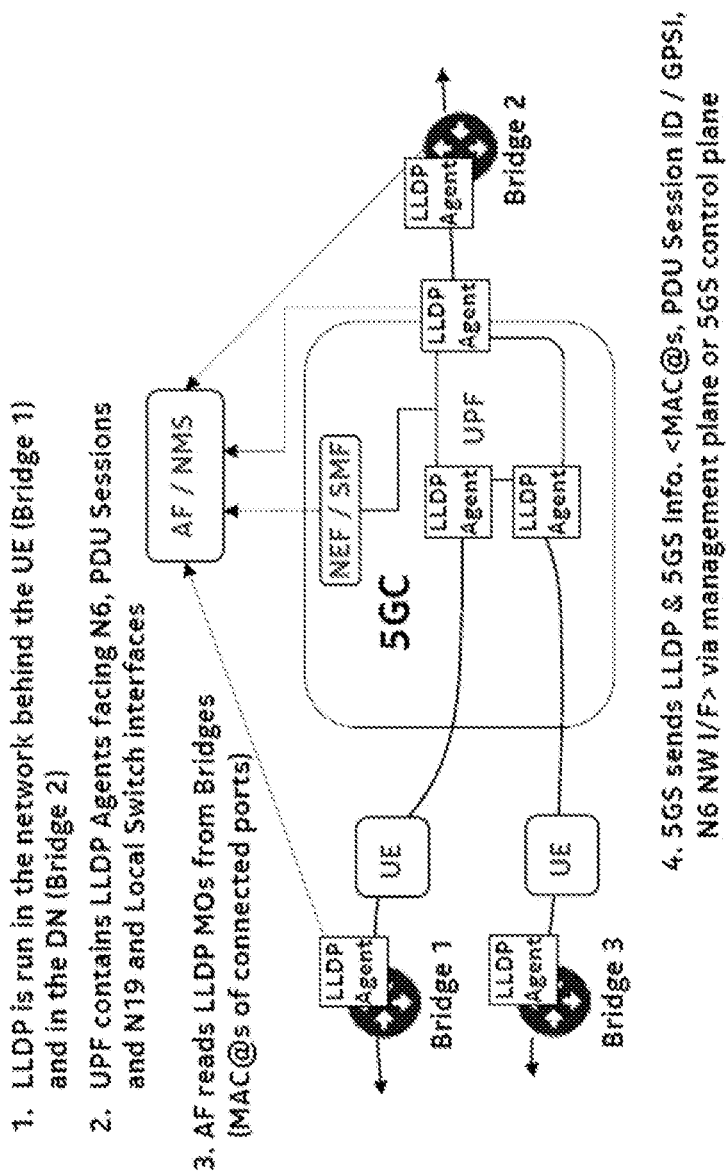
FIG. 2 illustrates a system depicting an example method, according to an embodiment.

FIG. 2 illustrates a system depicting an example method to determine network topology and the association between end stations and UEs or PDU sessions in the 5GS, according to an example embodiment. The example of FIG. 2 incorporates IEEE 802.1AB LLDP agents in the 5GS user plane.

As illustrated in the example of FIG. 2, at 1, devices and bridges in the DN and in the network (if any) behind the UE may run link layer discovery protocol (LLDP) as specified in IEEE 802.1AB. LLDP managed objects (MOs) may be created in each bridge. As further illustrated in the example of FIG. 2, at 2, UPFs may be configured with LLDP agents on user plane interfaces. Alternatively, a single LLDP agent may be configured for the UPF, where the single LLDP agent services all interfaces. The agents may identify these interfaces as 5GS ports of the same 5GS. Applicable interfaces may include N6 (interface to DN bridges) and N19 (direct interface to other UPFs supporting LLDP). The agents may run LLDP on these interfaces, exposing user-plane connectivity information through the UPFs and transparently through the UEs. The LLDP data units (LLDPDUs) may contain information (e.g., organization specific TLVs) indicating they are associated with a 5GS. Connected bridges receive the LLDPDUs from the 5GS and create IEEE 802.1AB MOs indicating that they are connected to the corresponding 5GS ports. If UEs are connected to (or integrated with) end-device(s), the end-device may send LLDPDU frames, which are forwarded to the UPF.

As also illustrated in the example of FIG. 2, at 3, an AF, which may act similar to a network management system (NMS), can read LLDP MOs from the bridges. The MOs may contain indications (e.g., based on the organization specific TLVs) that a connected port is associated with a 5GS. At 4, the 5GS may send LLDP and 5GS information via management plane or 5GS control plane. In certain embodiments, at least two options may be provided for the procedure at 4.

In one option for procedure 4, LLDP MOs may be created in the UPF based on the information in the LLDPDUs received from connected bridges and devices. These MOs may be read by an AF acting as an NMS. The IEEE 802.1AB MOs may include additional information provided by the 5GS indicating the UE and PDU session providing connectivity. Each N19 and N6 interface and each UE/PDU Session may be listed as a separate port.

According to another option for procedure 4, the 5GS may gather information from LLDPDUs received from the connected bridges. The 5GS may augment received information with additional information regarding UE and PDU session providing connectivity. The 5GS may expose through the NEF to an AF the resulting information (e.g., the information obtained from LLDPDUs along with 5GS specific information such as UE and PDU Session IDs). In some example embodiments, the resulting information may be determined separately for each N19 and N6 interface, and each UE or PDU Session. The process depicted in FIG. 2 can support the setup of 5GS QoS for deterministic flows between talker and listener devices (end stations), as discussed in more detail in the following.

Figure 3:
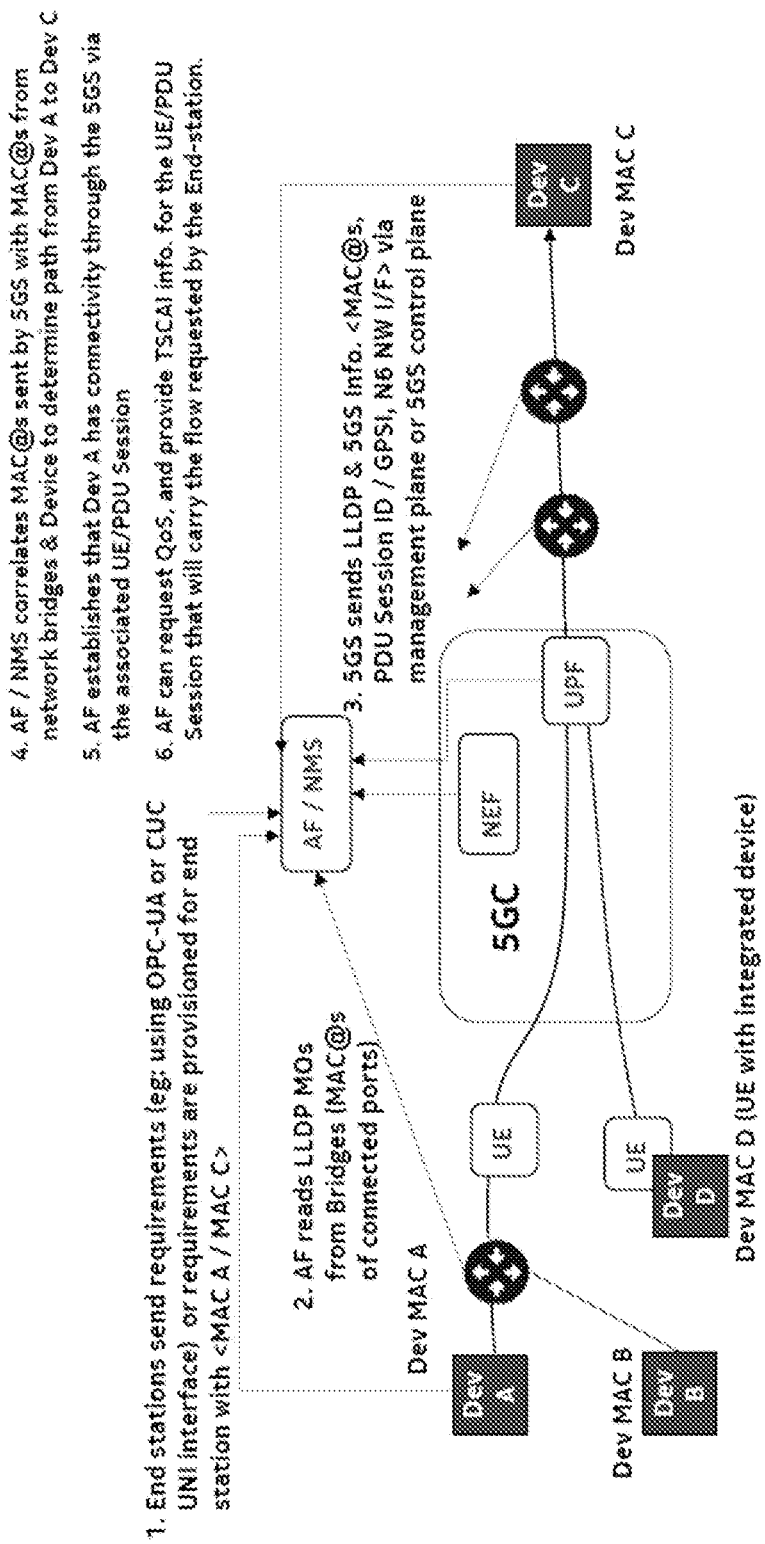
FIG. 3 illustrates another system depicting an example method, according to an embodiment.

FIG. 3 illustrates a system depicting an example embodiment for requesting TSC services for deterministic flows that transit the 5GS. As illustrated in the example of FIG. 3, at 1, end stations requiring periodic deterministic services may provide their requirements to an AF. The requirements may include maximum delay and flow periodicity. Alternatively, the requirements may be provisioned on the AF/NMS. The end stations may be identified in the request by their MAC addresses (e.g., MAC A and MAC C).

As further illustrated in the example of FIGS. 3, at 2 and 3, one or more LLDP agents on UPF may send LLDPDU frames on N6 and PDU sessions, which may be received and processed by bridges attached to N6 and UEs. Bridges attached to UEs and N6 may send LLDPDU frames, which may be received and processed by one or more LLDP agents located with the UPF. As described above, certain embodiments may provide information via LLDP managed objects and/or via the 5GS exposure framework (NEF) that describe connected neighbours in the user plane path. The information may include the MAC address of devices, bridges and the UPF "ports" that reside between the devices.

In the example of FIG. 3, at 4, the AF/NMS may construct the network topology, including the path between devices by correlating MAC addresses (MAC@s) provided in procedures 2 and 3. At 5, if the chain of a MAC@ between a sending end-device and a receiving end-device includes a MAC@ reported from the 5GS, the AF may calculate latency between the sending end-devices and 5GS based on the network topology and thereby determine TSCAI information (e.g., 5GS burst arrival time). If the chain of MAC@ between a sending and receiving end-device includes a MAC@ reported from the 5GS, at 6, the AF can use 5GS MAC address and/or UE/PDU session information provided by the invention to request QoS from the 5GS. The AF may provide the 5GS with TSCAI information determined in procedure 4 for the UE/PDU session associated with the flows from the device.

According to some example embodiments, the MAC@ exposed via LLDP on network interfaces (e.g., N6, N19) may correspond to individual UEs or PDU Sessions, in which case the LLDPDU frame may use a 5GS specific system name and description or it may appear as a two port MAC relay (TPMR) by using the optional system capability field (see IEEE 802.1AB, Table 8-4). In other example embodiments, the MAC@ exposed via LLDP on network interfaces (e.g., N6, N19) may be associated with the network interface.

Figure 4A:
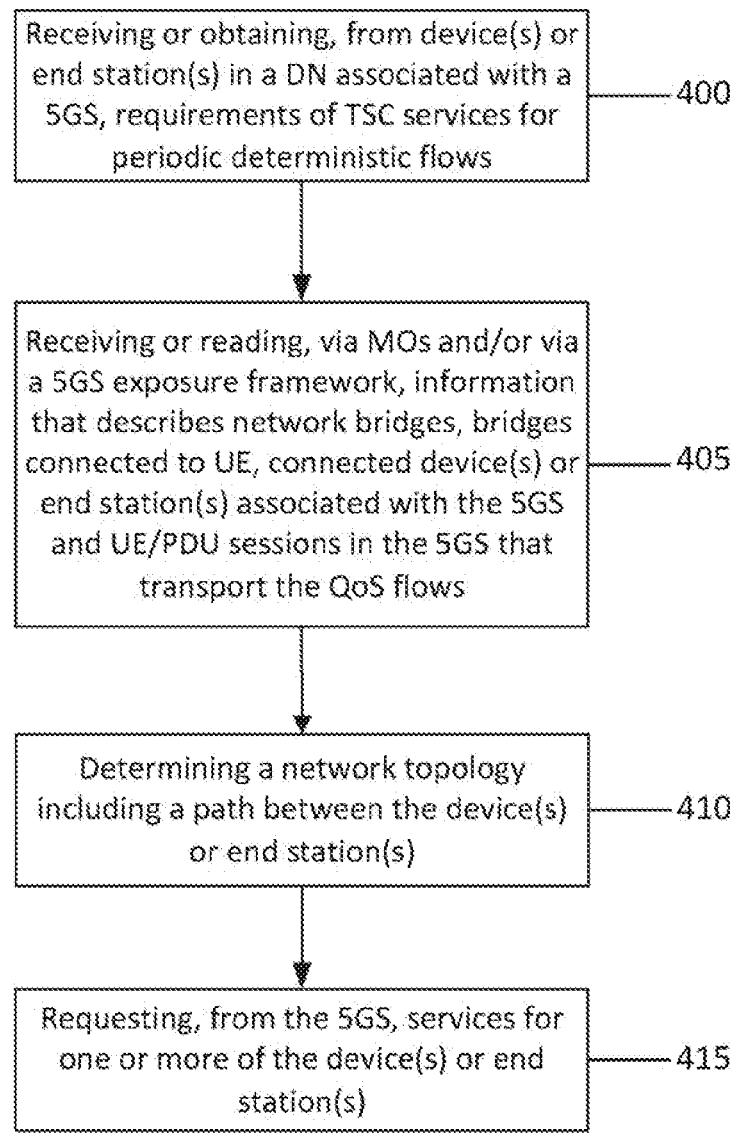
FIG. 4a illustrates an example flow diagram of a method, according to an embodiment.

FIG. 4a illustrates an example flow diagram of a method for exposure of communications network connectivity and data network connectivity topology, according to one example embodiment. In certain example embodiments, the flow diagram of FIG. 4a may be performed by a network entity or network node in a 3GPP system, such as LTE or 5G NR. For instance, in some example embodiments, the method of FIG. 4a may be performed by an AF, a NMS, or an AF acting as a NMS. For example, in some embodiments, the method of FIG. 4a may be performed by the AF/NMS illustrated in FIG. 2 or 3 and, therefore, the method may include any of the procedures performed by the AF/NMS of FIGS. 2 and 3, for example. The example method of FIG. 4a can enable entities using the 5GS exposure to be able to address the correct UE and PDU session within the 5GS in order to fulfill an end-to-end QoS requirement and to optimize scheduling in the 5GS.

As illustrated in the example of FIG. 4a, the method may include, at 400, receiving or obtaining, from one or more devices or end stations in a DN associated with a 5GS, requirements of services for QoS flows. For example, the requirements may include requirements for TSC services for the QoS flows. As such, in some embodiments, the QoS flows may include QoS flows carrying data of TSC services. In some embodiments, the receiving 400 may include being provided with the requirements from end stations requiring TSC services. In another embodiment, the receiving 400 may include the AF/NMS being provisioned with the requirements. According to an embodiment, the requirements may include, for example, the maximum delay and/or flow periodicity for the QoS flows from the device(s) or end station(s). In certain embodiments, the device(s) or end station(s) may be identified by their MAC addresses.

In an embodiment, the method of FIG. 4a may include, at 405, receiving or reading, via MOs (e.g., LLDP MOs) and/or via a 5GS exposure framework (e.g., NEF), information that describes the connectivity of network bridges, bridges connected to the UE, device(s) or end station(s) associated with the 5GS and UE/PDU sessions in the 5GS that transport the QoS flows. For example, MOs, such as LLDP MOs, may be created in a UPF based on information in LLDPDUs received from connected device(s), bridges or end station(s), and the reading 405 may include reading these created MOs in the UPF. According to some examples, the information received or read at 405 may include MAC addresses of the device(s), bridges, and/or connected ports (e.g., UPF ports) that reside between the device(s) or end station(s). In certain example embodiments, the information may be determined separately for each interface (e.g., N6 and N19 interfaces) and/or each UE/PDU session.

According to one embodiment, the method of FIG. 4a may include, at 410, determining or deriving a network topology including a path between the device(s) or end station(s) by correlating the MAC addresses of the device(s) or end station(s). In an embodiment, the determining 410 may include using the network topology for determining 5GS arrival times for periodic bursts sent by one or more of the device(s) or end station(s). According to one embodiment, the 5GS arrival time may be used to determine TSCAI for scheduling and/or for setting buffers in a UE or UPF.

In some example embodiments, the method of FIG. 4a may include, at 415, requesting, from the 5GS, services (e.g., TSC services) for one or more of the device(s) or end station(s). According to an embodiment, the requesting 415 may include indicating to the 5GS information that identifies the UE/PDU session that is providing connectivity to the one or more device(s) or end station(s). In another embodiment, the requesting 415 may include providing the 5GS with the TSCAI and/or requesting QoS for the UE/PDU session associated with the deterministic flows from the one or more device(s) or end station(s).

Figure 4B:
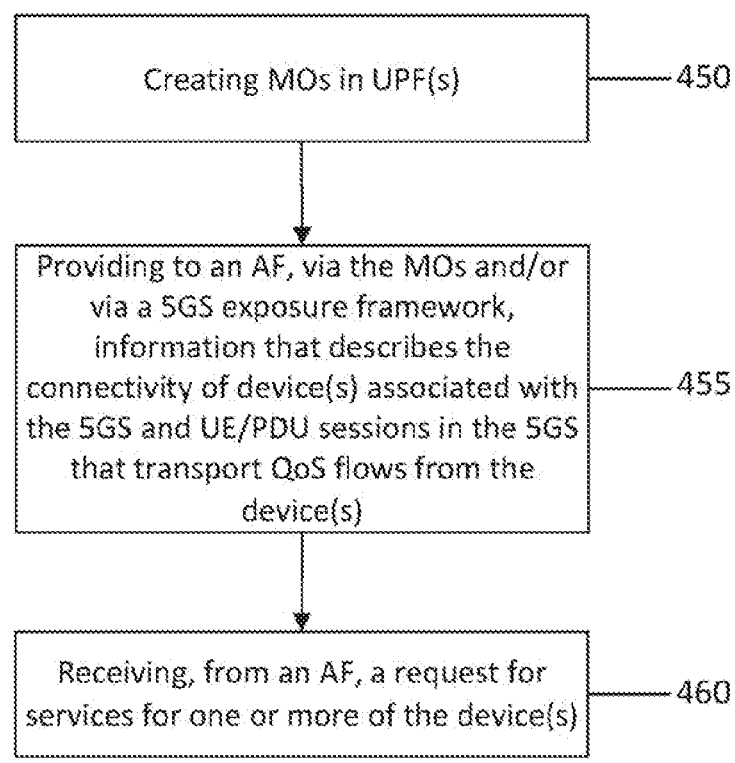
FIG. 4b illustrates an example flow diagram of a method, according to an embodiment.

FIG. 4b illustrates an example flow diagram of a method for exposure of communications network connectivity and data network connectivity topology, according to one example embodiment. In certain example embodiments, the flow diagram of FIG. 4b may be performed by a network entity or network node in a 3GPP system, such as LTE or 5G NR. For instance, in some example embodiments, the method of FIG. 4b may be performed by entities in a 5GS, such as a UPF, NEF or SMF. For example, in some embodiments, the method of FIG. 4b may be performed by entities in the 5GC illustrated in FIG. 2 or 3 and, therefore, the method may include any of the procedures performed by the UPF, NEF or SMF of FIGS. 2 and 3, for example.

According to an embodiment, the method of FIG. 4b may include, at 450, creating MOs in UPF(s). In one embodiment, the MOs may include LLDP MOs. The method may also include, at 455, providing or transmitting to an AF, via the MOs and/or via a 5GS exposure framework (e.g., NEF), information that describes the connectivity of device(s) or end station(s) associated with the 5GS and UE/PDU sessions in the 5GS that transport the QoS flows from the device(s) or end station(s). In an embodiment, the QoS flows may include QoS flows carrying data of TSC services.

For example, the creating 450 may include creating MOs (e.g., LLDP MOs) in a UPF based on information in LLDPDUs received from connected device(s), bridges or end station(s). In an embodiment, the MOs may identify user plane interfaces, such as N6 and/or N19 interfaces, and may run LLDP on these interfaces thereby exposing user plane connectivity information through the UPF(s) and transparently through the UE(s). According to some examples, the information provided at 455 may include MAC addresses of the device(s), bridges, and/or connected ports (e.g., UPF ports) that reside between the device(s) or end station(s). According to an embodiment, the method may include augmenting the information received in the LLDPDUs with additional information regarding the UE and PDU session providing connectivity. In other words, in some examples, the LLDP MOs may include additional information provided by the 5GS indicating the UE and PDU session providing connectivity, and the providing 455 may include exposing the resulting information through an NEF to an AF. In certain example embodiments, the method may include determining the resulting information separately for each interface (e.g., N6 and N19 interfaces) and/or each UE/PDU session.

According to some example embodiments, the method may include, at 460, receiving, from an AF, a request for services for one or more of the device(s) or end station(s). In an embodiment, the request for services may include a request for TSC services for at least one of the device(s) or end station(s). According to an embodiment, the receiving 460 may include receiving an indication of the UE/PDU session that is providing connectivity to the one or more device(s) or end station(s). In another embodiment, the receiving 460 may include receiving a request for QoS and/or the TSCAI for the UE/PDU session associated with the deterministic flows from the one or more device(s) or end station(s). According to an embodiment, the method may also include, based on the request for TSC services, setting up and/or modifying the QoS flow(s) in the 5GS to carry the TSC traffic. In some embodiments, the TSCAI may be sent to the SMF, which may calculate a set of TSCAI parameters (e.g., burst arrival time, flow periodicity, flow direction) that may be used by the RAN to assist traffic scheduling.

FIG. 5a illustrates an example of an apparatus 10 according to an embodiment. In an embodiment, apparatus 10 may be a node, host, or server in a communications network or serving such a network. For example, apparatus 10 may be or may include an AF, NMS, base station, a Node B, an evolved Node B (eNB), 5G Node B or access point, next generation Node B (NG-NB or gNB), CU of a gNB, WLAN access point, and/or other entity associated with a radio access network, such as 5G or NR. In one example, apparatus 10 may represent an AF/NMS as depicted in FIG. 2 or 3.

As illustrated in the example of FIG. 5a, apparatus 10 may include a processor 12 for processing information and executing instructions or operations. Processor 12 may be any type of general or specific purpose processor. In fact, processor 12 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 12 is shown in FIG. 5a, multiple processors may be utilized according to other embodiments. For example, it should be understood that, in certain embodiments, apparatus 10 may include two or more processors that may form a multiprocessor system (e.g., in this case processor 12 may represent a multiprocessor) that may support multiprocessing. In certain embodiments, the multiprocessor system may be tightly coupled or loosely coupled (e.g., to form a computer cluster).

Processor 12 may perform functions associated with the operation of apparatus 10, which may include, for example, precoding of antenna gain/phase parameters, encoding and decoding of individual bits forming a communication message, formatting of information, and overall control of the apparatus 10, including processes related to management of communication resources.

Apparatus 10 may further include or be coupled to a memory 14 (internal or external), which may be coupled to processor 12, for storing information and instructions that may be executed by processor 12. Memory 14 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 14 can be comprised of any combination of random access memory (RAM), read only memory (ROM), static storage such as a magnetic or optical disk, hard disk drive (HDD), or any other type of non-transitory machine or computer readable media. The instructions stored in memory 14 may include program instructions or computer program code that, when executed by processor 12, enable the apparatus 10 to perform tasks as described herein.

In an embodiment, apparatus 10 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 12 and/or apparatus 10.

In some embodiments, apparatus 10 may also include or be coupled to one or more antennas 15 for transmitting and receiving signals and/or data to and from apparatus 10. Apparatus may further include or be coupled to a transceiver 18 configured to transmit and receive information. The transceiver 18 may include, for example, a plurality of radio interfaces that may be coupled to the antenna(s) 15. The radio interfaces may correspond to a plurality of radio access technologies including one or more of GSM, NB-IoT, LTE, 5G, WLAN, Bluetooth, BT-LE, NFC, radio frequency identifier (RFID), ultrawideband (UWB), MulteFire, and the like. The radio interface may include components, such as filters, converters (for example, digital-to-analog converters and the like), mappers, a Fast Fourier Transform (FFT) module, and the like, to generate symbols for a transmission via one or more downlinks and to receive symbols (for example, via an uplink).

As such, transceiver 18 may be configured to modulate information on to a carrier waveform for transmission by the antenna(s) 15 and demodulate information received via the antenna(s) 15 for further processing by other elements of apparatus 10. In other embodiments, transceiver 18 may be capable of transmitting and receiving signals or data directly. Additionally or alternatively, in some embodiments, apparatus 10 may include an input and/or output device (I/O device).

In an embodiment, memory 14 may store software modules that provide functionality when executed by processor 12. The modules may include, for example, an operating system that provides operating system functionality for apparatus 10. The memory may also store one or more functional modules, such as an application or program, to provide additional functionality for apparatus 10. The components of apparatus 10 may be implemented in hardware, or as any suitable combination of hardware and software.

According to some embodiments, processor 12 and memory 14 may be included in or may form a part of processing circuitry or control circuitry. In addition, in some embodiments, transceiver 18 may be included in or may form a part of transceiving circuitry.

As used herein, the term "circuitry" may refer to hardware-only circuitry implementations (e.g., analog and/or digital circuitry), combinations of hardware circuits and software, combinations of analog and/or digital hardware circuits with software/firmware, any portions of hardware processor(s) with software (including digital signal processors) that work together to case an apparatus (e.g., apparatus 10) to perform various functions, and/or hardware circuit(s) and/or processor(s), or portions thereof, that use software for operation but where the software may not be present when it is not needed for operation. As a further example, as used herein, the term "circuitry" may also cover an implementation of merely a hardware circuit or processor (or multiple processors), or portion of a hardware circuit or processor, and its accompanying software and/or firmware. The term circuitry may also cover, for example, a baseband integrated circuit in a server, cellular network node or device, or other computing or network device.

As introduced above, in certain embodiments, apparatus 10 may be a network node or entity, such as an AF or NMS, or the like. According to certain embodiments, apparatus 10 may be controlled by memory 14 and processor 12 to perform the functions associated with any of the embodiments described herein. For example, in some embodiments, apparatus 10 may be configured to perform one or more of the processes depicted in any of the flow charts or signaling diagrams described herein, such as the flow diagram illustrated in FIG. 4*a*. For instance, in some examples, apparatus 10 may correspond to or represent the AF/NMS depicted in FIG. 2 or 3. In certain embodiments, apparatus 10 may be configured to perform a procedure for the exposure of 3GPP communications network connectivity and data network connectivity topology.

In one embodiment, apparatus 10 may be controlled by memory 14 and processor 12 to receive or obtain, from one or more devices or end stations in a DN associated with a 5GS, requirements of TSC services for periodic deterministic flows. In some embodiments, apparatus 10 may be provided with the requirements from end stations requiring periodic deterministic services.

In another embodiment, apparatus 10 may be provisioned with the requirements. According to an embodiment, the requirements may include, for example, the maximum delay and/or flow periodicity for the device(s) or end station(s). In certain embodiments, the device(s) or end station(s) may be identified by their MAC addresses.

In an embodiment, apparatus 10 may be controlled by memory 14 and processor 12 to receive or read, via LLDP MOs and/or via a 5GS exposure framework (e.g., NEF), information that describes the connectivity of device(s), network bridges, bridges connected to the UE, or end station(s) associated with the 5GS and UE/PDU sessions in the 5GS that transport the deterministic flows. For example, LLDP MOs may be created in a UPF based on information in LLDPDUs received from connected device(s), bridges or end station(s), and apparatus 10 may be controlled by memory 14 and processor 12 to read these created MOs in the UPF. According to some examples, the information received or read may include MAC addresses of the device (s), bridges, and/or connected ports (e.g., UPF ports) that reside between the device(s) or end station(s). In certain example embodiments, the information may be determined separately for each interface (e.g., N6 and N19 interfaces) and/or each UE/PDU session.

According to one embodiment, apparatus 10 may be controlled by memory 14 and processor 12 to determine or construct a network topology including a path between the device(s) or end station(s) by correlating the MAC addresses of the device(s) or end station(s). In an embodiment, apparatus 10 may be controlled by memory 14 and processor 12 to use the network topology to determine 5GS arrival times for periodic bursts sent by one or more of the device(s) or end station(s). According to one embodiment, apparatus 10 may be controlled by memory 14 and processor 12 to use the 5GS arrival time to determine TSCAI for scheduling and/or for setting buffers in a UE or UPF.

In some example embodiments, apparatus 10 may be controlled by memory 14 and processor 12 to request, from the 5GS, TSC services for one or more of the device(s) or end station(s). According to an embodiment, when requesting the TSC services, apparatus 10 may be controlled by memory 14 and processor 12 to indicate to the 5GS the UE/PDU session that is providing connectivity to the one or more device(s) or end station(s). In another embodiment, when requesting the TSC services, apparatus 10 may be controlled by memory 14 and processor 12 to provide the 5GS with the TSCAI and request QoS for the UE/PDU session associated with the deterministic flows from the one or more device(s) or end station(s).

FIG. 5*b* illustrates an example of an apparatus 20 according to another example embodiment. In example embodiments, apparatus 20 may be a node or server associated with a radio access network, such as a LTE network, 5G or NR or other radio systems which might benefit from an equivalent procedure. For example, apparatus 20 may be or may include a 5GS entity, such as a UPF, NEF, or SMF, base station, a Node B, an evolved Node B (eNB), 5G Node B or access point, next generation Node B (NG-NB or gNB), CU of a gNB, WLAN access point, and/or other entity associated with a radio access network, such as 5G or NR. In one example, apparatus 20 may represent a 5GC entity as depicted in FIG. 2 or 3. For instance, apparatus 20 may represent one or more of a UPF, NEF or SMF.

It should be understood that, in some example embodiments, apparatus 20 may be comprised of an edge cloud server as a distributed computing system where the server and the radio node may be stand-alone apparatuses communicating with each other via a radio path or via a wired connection, or they may be located in a same entity communicating via a wired connection. For instance, in certain example embodiments where apparatus 20 represents a gNB, it may be configured in a central unit (CU) and distributed unit (DU) architecture that divides the gNB functionality. In such an architecture, the CU may be a logical node that includes gNB functions such as transfer of user data, mobility control, radio access network sharing, positioning, and/or session management, etc. The CU may control the operation of DU(s) over a front-haul interface. The DU may be a logical node that includes a subset of the gNB functions, depending on the functional split option. It should be noted that one of ordinary skill in the art would understand that apparatus 20 may include components or features not shown in FIG. 5*b*.

In some example embodiments, apparatus 20 may include one or more processors, one or more computer-readable storage medium (for example, memory, storage, or the like), one or more radio access components (for example, a modem, a transceiver, or the like), and/or a user interface. In some example embodiments, apparatus 20 may be configured to operate using one or more radio access technologies, such as GSM, LTE, LTE-A, NR, 5G, WLAN, WiFi, NB-IoT, MulteFire, and/or any other radio access technologies. It should be noted that one of ordinary skill in the art would understand that apparatus 20 may include components or features not shown in FIG. 5*b*.

As illustrated in the example of FIG. 5*b*, apparatus 20 may include or be coupled to a processor 22 for processing information and executing instructions or operations. Processor 22 may be any type of general or specific purpose processor. In fact, processor 22 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 22 is shown in FIG. 5*b*, multiple processors may be utilized according to other example embodiments. For example, it should be understood that, in certain example embodiments, apparatus 20 may include two or more processors that may form a multiprocessor system (e.g., in this case processor 22 may represent a multiprocessor) that may support multiprocessing. In certain example embodiments, the multiprocessor system may be tightly coupled or loosely coupled (e.g., to form a computer cluster).

Processor 22 may perform functions associated with the operation of apparatus 20 including, as some examples, precoding of antenna gain/phase parameters, encoding and decoding of individual bits forming a communication message, formatting of information, and overall control of the apparatus 20, including processes related to management of communication resources.

Apparatus 20 may further include or be coupled to a memory 24 (internal or external), which may be coupled to processor 22, for storing information and instructions that may be executed by processor 22. Memory 24 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 24 can be comprised of any combination of random access memory (RAM), read only memory (ROM), static storage such as a magnetic or optical disk, hard disk drive (HDD), or any other type of non-transitory machine or computer readable media. The instructions stored in memory 24 may include program instructions or computer program code that, when executed by processor 22, enable the apparatus 20 to perform tasks as described herein.

In an example embodiment, apparatus 20 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 22 and/or apparatus 20.

In example embodiments, apparatus 20 may also include or be coupled to one or more antennas 25 for receiving a downlink signal and for transmitting via an uplink from apparatus 20. Apparatus 20 may further include a transceiver 28 configured to transmit and receive information. The transceiver 28 may also include a radio interface (e.g., a modem) coupled to the antenna 25. The radio interface may correspond to a plurality of radio access technologies including one or more of GSM, LTE, LTE-A, 5G, NR, WLAN, NB-IoT, BT-LE, RFID, UWB, and the like. The radio interface may include other components, such as filters, converters (for example, digital-to-analog converters and the like), symbol demappers, signal shaping components, an Inverse Fast Fourier Transform (IFFT) module, and the like, to process symbols, such as OFDMA symbols, carried by a downlink or an uplink.

For instance, in one example embodiment, transceiver 28 may be configured to modulate information on to a carrier waveform for transmission by the antenna(s) 25 and demodulate information received via the antenna(s) 25 for further processing by other elements of apparatus 20. In other example embodiments, transceiver 28 may be capable of transmitting and receiving signals or data directly. Additionally or alternatively, in some example embodiments, apparatus 10 may include an input and/or output device (I/O device). In certain examples, apparatus 20 may further include a user interface, such as a graphical user interface or touchscreen.

In an example embodiment, memory 24 stores software modules that provide functionality when executed by processor 22. The modules may include, for example, an operating system that provides operating system functionality for apparatus 20. The memory may also store one or more functional modules, such as an application or program, to provide additional functionality for apparatus 20. The components of apparatus 20 may be implemented in hardware, or as any suitable combination of hardware and software. According to an example embodiment, apparatus 20 may optionally be configured to communicate with apparatus 10 via a wireless or wired communications link 70 according to any radio access technology, such as NR. For instance, in an example embodiment, link 70 may represent the Xn interface.

According to some example embodiments, processor 22 and memory 24 may be included in or may form a part of processing circuitry or control circuitry. In addition, in some example embodiments, transceiver 28 may be included in or may form a part of transceiving circuitry.

As discussed above, according to example embodiments, apparatus 20 may be a network node or entity, such as an entity in 5GS, UPF, NEF and/or SMF, or the like. According to certain embodiments, apparatus 20 may be controlled by memory 14 and processor 12 to perform the functions associated with any of the embodiments described herein. For example, in some embodiments, apparatus 20 may be configured to perform one or more of the processes depicted in any of the flow charts or signaling diagrams described herein, such as the flow chart of FIG. 4b. For instance, in some examples, apparatus 20 may correspond to or represent the UPF and/or NEF/SMF depicted in FIG. 2 or 3. In certain embodiments, apparatus 20 may be configured to perform a procedure for the exposure of 3GPP communications network connectivity and data network connectivity topology.

According to certain embodiments, apparatus 20 may be controlled by memory 24 and processor 22 to create LLDP MOs in one or more UPF(s). For example, apparatus 20 may be controlled by memory 24 and processor 22 to create LLDP MOs in a UPF based on information in LLDPDUs received from connected device(s), bridges or end station(s). In an embodiment, apparatus 20 may be controlled by memory 24 and processor 22 to provide or transmit to an AF, via the LLDP MOs and/or via a 5GS exposure framework (e.g., NEF), information that describes the connectivity of device(s) or end station(s) associated with the 5GS and UE/PDU sessions in the 5GS that transport the deterministic flows. In an embodiment, the LLDP MOs may identify user plane interfaces, such as N6 and/or N19 interfaces, and may run LLDP on these interfaces thereby exposing user plane connectivity information through the UPF(s) and transparently through the UE(s). According to some examples, the information may include MAC addresses of the device(s), bridges, and/or connected ports (e.g., UPF ports) that reside between the device(s) or end station(s). According to an embodiment, apparatus 20 may be controlled by memory 24 and processor 22 to augment the information received in the LLDPDUs with additional information regarding the UE and PDU session providing connectivity. In other words, in some examples, the LLDP MOs may include additional information provided by the 5GS indicating the UE and PDU session providing connectivity, and apparatus 20 may be controlled by memory 24 and processor 22 to expose the resulting information through an NEF to an AF. In certain example embodiments, apparatus 20 may be controlled by memory 24 and processor 22 to determine the resulting information separately for each interface (e.g., N6 and N19 interfaces) and/or each UE/PDU session.

According to some example embodiments, apparatus 20 may be controlled by memory 24 and processor 22 to receive, from an AF, a request for TSC services for one or more device(s) or end station(s). According to an embodiment, when receiving the request, apparatus 20 may be controlled by memory 24 and processor 22 to receive an indication of the UE/PDU session that is providing connectivity to the one or more device(s) or end station(s). In another embodiment, when receiving the request, apparatus 20 may be controlled by memory 24 and processor 22 to receive a request for QoS and/or the TSCAI for the UE/PDU session associated with the deterministic flows from the one or more device(s) or end station(s). According to an embodiment, apparatus 20 may be controlled by memory 24 and processor 22 to, based on the request for TSC services, set up or modify QoS flow(s) in the 5GS to carry the TSC traffic. In some embodiments, the TSCAI may be sent to the SMF, which may calculate a set of TSCAI parameters (e.g., burst arrival time, flow periodicity, flow direction) that may be used by the RAN to assist traffic scheduling.

FIG. 5c illustrates an example of an apparatus 30 according to another example embodiment. In an example embodiment, apparatus 30 may be a node or element in a communications network or associated with such a network, such as a UE, mobile equipment (ME), mobile station, mobile device, stationary device, IoT device, or other device. As described herein, UE may alternatively be referred to as, for example, a mobile station, mobile equipment, mobile unit, mobile device, user device, subscriber station, wireless terminal, tablet, smart phone, IoT device or NB-IoT device, a connected car, or the like. As one example, apparatus 30 may be implemented in, for instance, a wireless handheld device, a wireless plug-in accessory, or the like. In one embodiment, apparatus 30 may represent or include a UE and/or bridge in a DN, as illustrated in the examples of FIG. 2 or 3.

In some example embodiments, apparatus 30 may include one or more processors, one or more computer-readable storage medium (for example, memory, storage, or the like), one or more radio access components (for example, a modem, a transceiver, or the like), and/or a user interface. In some example embodiments, apparatus 30 may be configured to operate using one or more radio access technologies, such as GSM, LTE, LTE-A, NR, 5G, WLAN, WiFi, NB-IoT, MulteFire, and/or any other radio access technologies. It should be noted that one of ordinary skill in the art would understand that apparatus 30 may include components or features not shown in FIG. 5c.

As illustrated in the example of FIG. 5c, apparatus 30 may include or be coupled to a processor 32 for processing information and executing instructions or operations. Processor 32 may be any type of general or specific purpose processor. In fact, processor 32 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 32 is shown in FIG. 5c, multiple processors may be utilized according to other example embodiments. For example, it should be understood that, in certain example embodiments, apparatus 30 may include two or more processors that may form a multiprocessor system (e.g., in this case processor 32 may represent a multiprocessor) that may support multiprocessing. In certain example embodiments, the multiprocessor system may be tightly coupled or loosely coupled (e.g., to form a computer cluster).

Processor 32 may perform functions associated with the operation of apparatus 30 including, as some examples, precoding of antenna gain/phase parameters, encoding and decoding of individual bits forming a communication message, formatting of information, and overall control of the apparatus 30, including processes related to management of communication resources.

Apparatus 30 may further include or be coupled to a memory 34 (internal or external), which may be coupled to processor 32, for storing information and instructions that may be executed by processor 32. Memory 34 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 34 can be comprised of any combination of random access memory (RAM), read only memory (ROM), static storage such as a magnetic or optical disk, hard disk drive (HDD), or any other type of non-transitory machine or computer readable media. The instructions stored in memory 34 may include program instructions or computer program code that, when executed by processor 32, enable the apparatus 30 to perform tasks as described herein.

In an example embodiment, apparatus 30 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 32 and/or apparatus 30.

In some example embodiments, apparatus 30 may also include or be coupled to one or more antennas 35 for receiving a downlink signal and for transmitting via an uplink from apparatus 30. Apparatus 30 may further include a transceiver 38 configured to transmit and receive information. The transceiver 38 may also include a radio interface (e.g., a modem) coupled to the antenna 35. The radio interface may correspond to a plurality of radio access technologies including one or more of GSM, LTE, LTE-A, 5G, NR, WLAN, NB-IoT, BT-LE, RFID, UWB, and the like.

The radio interface may include other components, such as filters, converters (for example, digital-to-analog converters and the like), symbol demappers, signal shaping components, an Inverse Fast Fourier Transform (IFFT) module, and the like, to process symbols, such as OFDMA symbols, carried by a downlink or an uplink.

For instance, transceiver 38 may be configured to modulate information on to a carrier waveform for transmission by the antenna(s) 35 and demodulate information received via the antenna(s) 35 for further processing by other elements of apparatus 30. In other example embodiments, transceiver 38 may be capable of transmitting and receiving signals or data directly. Additionally or alternatively, in some example embodiments, apparatus 30 may include an input and/or output device (I/O device). In certain example embodiments, apparatus 30 may further include a user interface, such as a graphical user interface or touchscreen.

In an example embodiment, memory 34 stores software modules that provide functionality when executed by processor 32. The modules may include, for example, an operating system that provides operating system functionality for apparatus 30. The memory may also store one or more functional modules, such as an application or program, to provide additional functionality for apparatus 30. The components of apparatus 30 may be implemented in hardware, or as any suitable combination of hardware and software. According to an example embodiment, apparatus 30 may optionally be configured to communicate with apparatus 10 via a wireless or wired communications link 71 and/or to communicate with apparatus 20 via a wireless or wired communications link 72, according to any radio access technology, such as NR.

According to some example embodiments, processor 32 and memory 34 may be included in or may form a part of processing circuitry or control circuitry. In addition, in some example embodiments, transceiver 38 may be included in or may form a part of transceiving circuitry.

As discussed above, according to some example embodiments, apparatus 30 may be a MCPTT client, UE, mobile device, mobile station, ME, IoT device and/or NB-IoT device, for example. According to certain example embodiments, apparatus 30 may be controlled by memory 34 and processor 32 to perform the functions associated with example embodiments described herein. For instance, in some embodiments, apparatus 30 may be configured to perform one or more of the processes depicted in any of the diagrams or signaling flow diagrams described herein. As an example, apparatus 30 may correspond to one or more of the UEs or bridges in FIG. 2 or 3.

In on embodiment, apparatus 30 may be controlled by memory 34 and processor 32 to run LLDP and create LLDP MOs. In an embodiment, apparatus 30 may be controlled by memory 34 and processor 32 to provide its requirements for periodic deterministic services to an AF. In one embodiment, apparatus 30 may be configure to provide its requirements by transmitting a request to the AF. For example, the requirements may include maximum delay and/or flow periodicity. In an embodiment, apparatus 30 may be controlled by memory 34 and processor 32 to identify itself in the request by its MAC address.

Therefore, certain example embodiments provide several technological improvements, enhancements, and/or advantages over existing technological processes and constitute an improvement at least to the technological field of wireless network control and management. For example, certain embodiments provide a system and method for the exposure of 3GPP communications network connectivity and data network connectivity topology. For instance, some embodiments may address at least the problem of associating UEs and PDU Sessions with end-to-end network topology in a DN, e.g., including devices and networks connected to UEs as well as to UPFs. This association ensures that entities using the 3GPP network exposure are able to address the correct UE and PDU session within the 5GS in order to fulfill an end-to-end QoS requirement. In addition, for periodic deterministic communication, knowing the DN topology with respect to the 5GS allows for more accurate determination of burst arrival times used to optimize scheduling in the 5GS RAN. To enable this association, example embodiments can be configured to expose connectivity information as well, which allows an external function to correlate this connectivity information with its own network topology/connectivity information. As a result, example embodiments may at least improve throughput, latency, and/or processing speed of network nodes and/or UEs. Accordingly, the use of certain example embodiments results in improved functioning of communications networks and their nodes, such as base stations, eNBs, gNBs, and/or UEs or mobile stations.

In some example embodiments, the functionality of any of the methods, processes, signaling diagrams, algorithms or flow charts described herein may be implemented by software and/or computer program code or portions of code stored in memory or other computer readable or tangible media, and executed by a processor.

In some example embodiments, an apparatus may be included or be associated with at least one software application, module, unit or entity configured as arithmetic operation(s), or as a program or portions of it (including an added or updated software routine), executed by at least one operation processor. Programs, also called program products or computer programs, including software routines, applets and macros, may be stored in any apparatus-readable data storage medium and may include program instructions to perform particular tasks.

A computer program product may include one or more computer-executable components which, when the program is run, are configured to carry out some example embodiments. The one or more computer-executable components may be at least one software code or portions of code. Modifications and configurations required for implementing functionality of an example embodiment may be performed as routine(s), which may be implemented as added or updated software routine(s). In one example, software routine(s) may be downloaded into the apparatus.

As an example, software or computer program code or portions of code may be in source code form, object code form, or in some intermediate form, and it may be stored in some sort of carrier, distribution medium, or computer readable medium, which may be any entity or device capable of carrying the program. Such carriers may include a record medium, computer memory, read-only memory, photoelectrical and/or electrical carrier signal, telecommunications signal, and/or software distribution package, for example. Depending on the processing power needed, the computer program may be executed in a single electronic digital computer or it may be distributed amongst a number of computers. The computer readable medium or computer readable storage medium may be a non-transitory medium.

In other example embodiments, the functionality may be performed by hardware or circuitry included in an apparatus (e.g., apparatus 10 or apparatus 20 or apparatus 30), for example through the use of an application specific integrated circuit (ASIC), a programmable gate array (PGA), a field programmable gate array (FPGA), or any other combination of hardware and software. In yet another example embodiment, the functionality may be implemented as a signal, such as a non-tangible means, that can be carried by an electromagnetic signal downloaded from the Internet or other network.

According to an example embodiment, an apparatus, such as a node, device, or a corresponding component, may be configured as circuitry, a computer or a microprocessor, such as single-chip computer element, or as a chipset, which may include at least a memory for providing storage capacity used for arithmetic operation(s) and/or an operation processor for executing the arithmetic operation(s).

One having ordinary skill in the art will readily understand that the example embodiments as discussed above may be practiced with procedures in a different order, and/or with hardware elements in configurations which are different than those which are disclosed. Therefore, although some embodiments have been described based upon these example embodiments, it would be apparent to those of skill in the art that certain modifications, variations, and alternative constructions would be apparent, while remaining within the spirit and scope of example embodiments.

What is claimed is:

1. A method, comprising:

receiving, from one or more devices or one or more end stations in a data network (DN) associated with a 5th generation system (5GS), requirements of time sensitive communication (TSC) services for quality of service (QOS) flows;

receiving, via Link Layer Discovery Protocol (LLDP) managed objects (MOs) and via a 5GS network exposure function, information that describes connectivity of the one or more devices or the one or more end stations and identifies one or more user equipment (UE) sessions or one or more protocol data unit (PDU) sessions in the 5GS that transport the QoS flows across an N6 interface and an N19 interface, wherein the information defines the connectivity separately for each of the N6 interface and the N19 interface, for each of the one or more UE sessions or the one or more PDU sessions, or for both, and wherein the one or more devices or the one or more end stations are identified by their medium access control (MAC) addresses;

determining a network topology including a path between the one or more devices or the one or more end stations by correlating the respective MAC addresses of the one or more devices or the one or more end stations;

calculating, based on the network topology, a latency for the path between a sending device of the one or more devices and the 5GS, wherein the path includes a MAC address reported from the 5GS;

determining, based on the calculated latency, a 5GS arrival time for a periodic burst sent by the sending device;

determining, using the 5GS arrival time, TSC assistance information (TSCAI) for at scheduling and setting a buffer in a UE associated with one of the one or more UE sessions and in a user plane function (UPF) of the 5GS; and requesting, from the 5GS, the TSC services for at least one of the one or more devices or the one or more end stations, wherein the requesting comprises:
  indicating, to the 5GS, information that identifies one of the one or more UE sessions or one of the one or more PDU sessions that provides connectivity to the at least one of the one or more devices or the one or more end stations; and
  providing the 5GS with at least one of a request for QoS and the determined TSCAI for the identified UE session or the PDU session associated with the QoS flows.

2. The method according to claim 1, wherein the QoS flows comprise QoS flows carrying data of the TSC services.

3. The method according to claim 2, wherein the requirements comprise at least one of a maximum delay and flow periodicity for the QoS flows from the one or more devices or the one or more end stations.

4. The method according to claim 3, wherein the information that describes the connectivity of the one or more devices or the one or more end stations comprises MAC addresses of at least one of the one or more devices, MAC addresses of bridges, and MAC addresses of connected ports that reside between the one or more devices or the one or more end stations.

5. A method, comprising:
  creating link layer discovery protocol (LLDP) managed objects (MOs) in one or more user plane functions (UPFs) of a 5th generation system (5GS) based on information in link layer discovery protocol data units (LLDPDUs) received from at least one of one or more devices, one or more end stations, or one or more bridges, wherein the LLDPDUs comprise organization specific type-length-value (TLV) fields indicated association with the 5GS;
  augmenting the information received in the LLDPDUs with additional information regarding a user equipment (UE) and a protocol data unit (PDU) session providing connectivity to the one or more devices or the one or more end stations to generate resulting information;
  providing via a 5GS network exposure function (NEF), the resulting information, wherein the resulting information describes connectivity of the one or more devices or the one or more end stations and identifies one or more user equipment (UE) sessions or one or more protocol data unit (PDU) sessions in the 5GS that transport quality of service (QOS) flows, wherein the providing of the resulting information that describes the connectivity of the one or more devices or the one or more end stations comprises exposing the resulting information through the NEF to an application function (AF), wherein the resulting information is determined separately for an N6 interface and an N19 interface, for each of the one or more UE sessions and the one or more PDU sessions, and wherein the one or more devices or the one or more end stations are identified by their medium access control (MAC) addresses obtained from the LLDPDUs and MAC addresses exposed by the 5GS; and receiving, from the AF, a request for time sensitive communication (TSC) services for at least one of the one or more devices or the one or more end stations, wherein the request comprises:
  receiving an indication that identifies one of the one or more UE sessions or one of the one or more PDU sessions that provides connectivity to the at least one of the one or more devices or the one or more end stations; and
  receiving a request for QoS and TSC assistance information (TSCAI) for the identified UE session or the PDU session associated with the QoS flows; and
  based on the received request, setting up and modifying the QoS flows in the 5GS to carry the TSC traffic.

6. The method according to claim 5, wherein the QoS flows comprise QoS flows carrying data of the TSC services.

7. The method according to claim 6, wherein the creating comprises creating the LLDP MOs in a user plane function (UPF) of the one or more UPFs based on information in the LLDPDUs received from the one or more devices or the or more end stations or one or more bridges.

8. The method according to claim 7, wherein the managed objects (MOs) identify the N6 and N19 interfaces and run link layer discovery protocol (LLDP) on the N6 and thereby exposing user plane connectivity information through the one or more functions (UPFs and transparently through a UE.

9. The method according to claim 8, wherein the information that describes the connectivity of the one or more devices or the one or more end stations comprises at least one of medium access control (MAC) addresses of the devices, MAC addresses of bridges, or MAC addresses connected ports that reside between the one or more devices or the one or more end stations.

* * * * *